Aug. 30, 1966  A. C. DURDIN ETAL  3,269,703
GAS TURBINE ENGINE STARTER
Original Filed Aug. 30, 1960  4 Sheets-Sheet 1

INVENTORS:
Augustus C. Durdin
Bernard W. Kittle
Stephen S. Baits
Donald F. Swenski
By
Attys

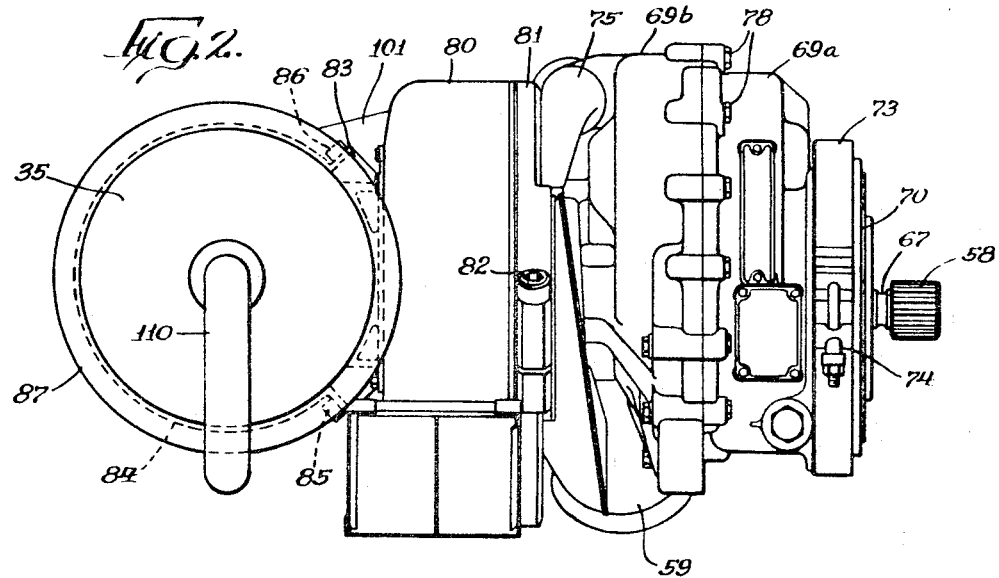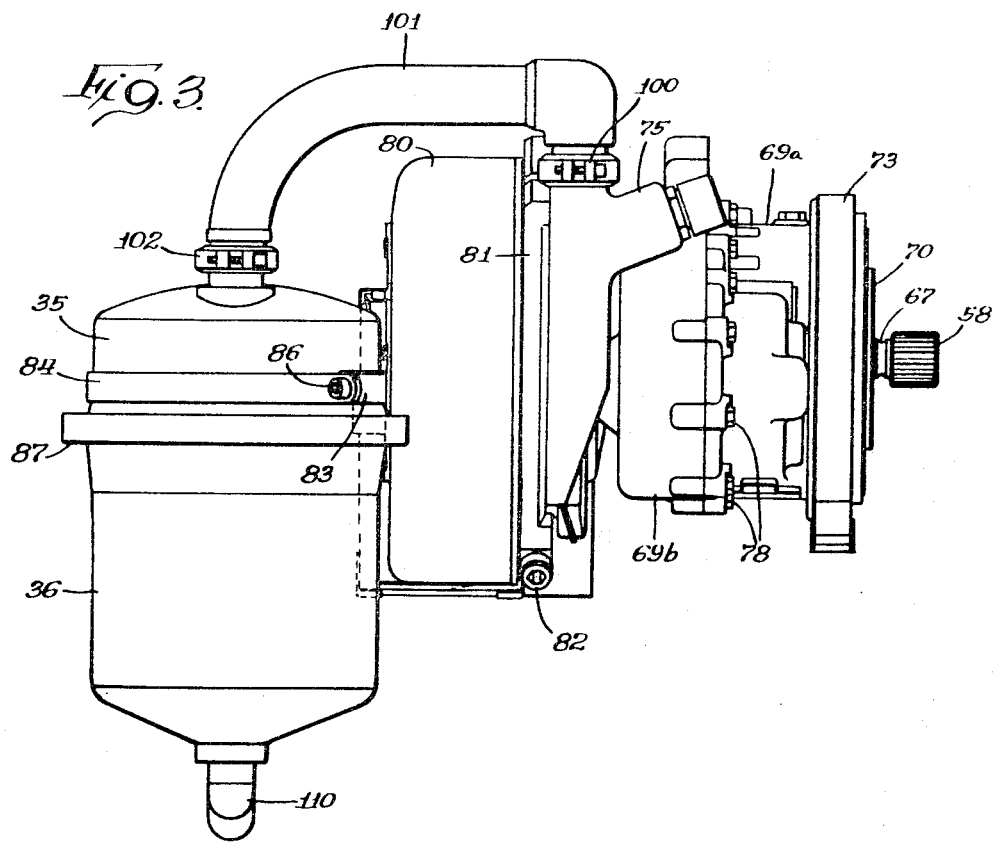

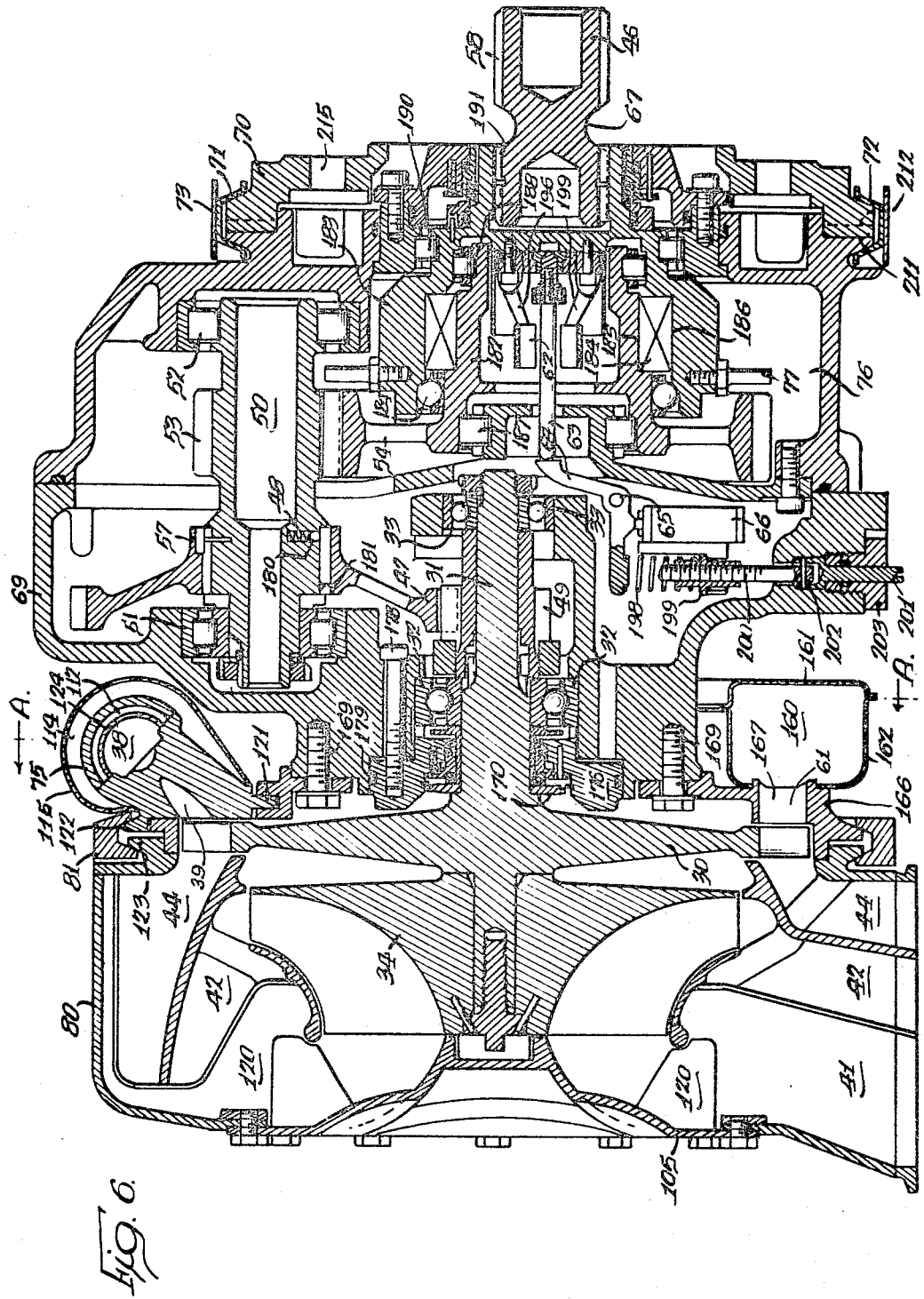

3,269,703
GAS TURBINE ENGINE STARTER
Augustus C. Durdin, Rockton, Bernard W. Kittle and
Stephen S. Baits, Rockford, Ill., and Donald F. Swenski,
Arvada, Colo., assignors to Sundstrand Corporation, a
corporation of Illinois
Original application Aug. 30, 1960, Ser. No. 52,845.
Divided and this application Dec. 18, 1964, Ser. No.
419,433
8 Claims. (Cl. 253—78)

The present invention relates to engine starters and more particularly to turbojet aircraft engine starters. This application is a division of copending application Serial No. 52,845 filed August 30, 1960, now abandoned.

The increasing use of turbojet engines in commercial and military aircraft has produced the need for a lightweight turbojet engine starter which can also have a reasonably long life between overhauls. Most of the starter systems presently used on these engines require associated ground equipment. This is a handicap particularly for military aircraft where there is a definite need to operate from fields which may not have the necessary ground equipment available. In addition, the starters presently used are not easily removed or replaced on the aircraft.

It is therefore an object of the present invention to provide a new and improved engine starter particularly suited to turbojet engines.

Another object is to provide an engine starter for turbojet engines which may be quickly mounted on and removed from such engines.

An additional object is to provide a new and improved engine starter having a gas turbine which may be driven either by compressed air or by the gas produced by the combustion of a fuel.

A further object of the present invention is to provide a housing for an engine starter having a turbine which may be quickly disassembled and a clamp for the housing which provides additional support around the periphery of the turbine.

Additional objects will become apparent from the following description of the accompanying drawings in which there is illustrated a preferred embodiment of the invention.

In the drawings, FIG. 1 is a schematic drawing illustrating a starter embodying the principles of the present invention;

FIG. 2 is an external front view of the starter with the combustion chamber mounted on the end of the starter ducting housing;

FIG. 3 is an external top view of the starter, as shown in FIG. 2, with the combustion chamber mounted on the end of the ducting housing;

FIG. 6 is a cross-sectional view taken along a vertical plane through the center of the starter.

Figure 1:
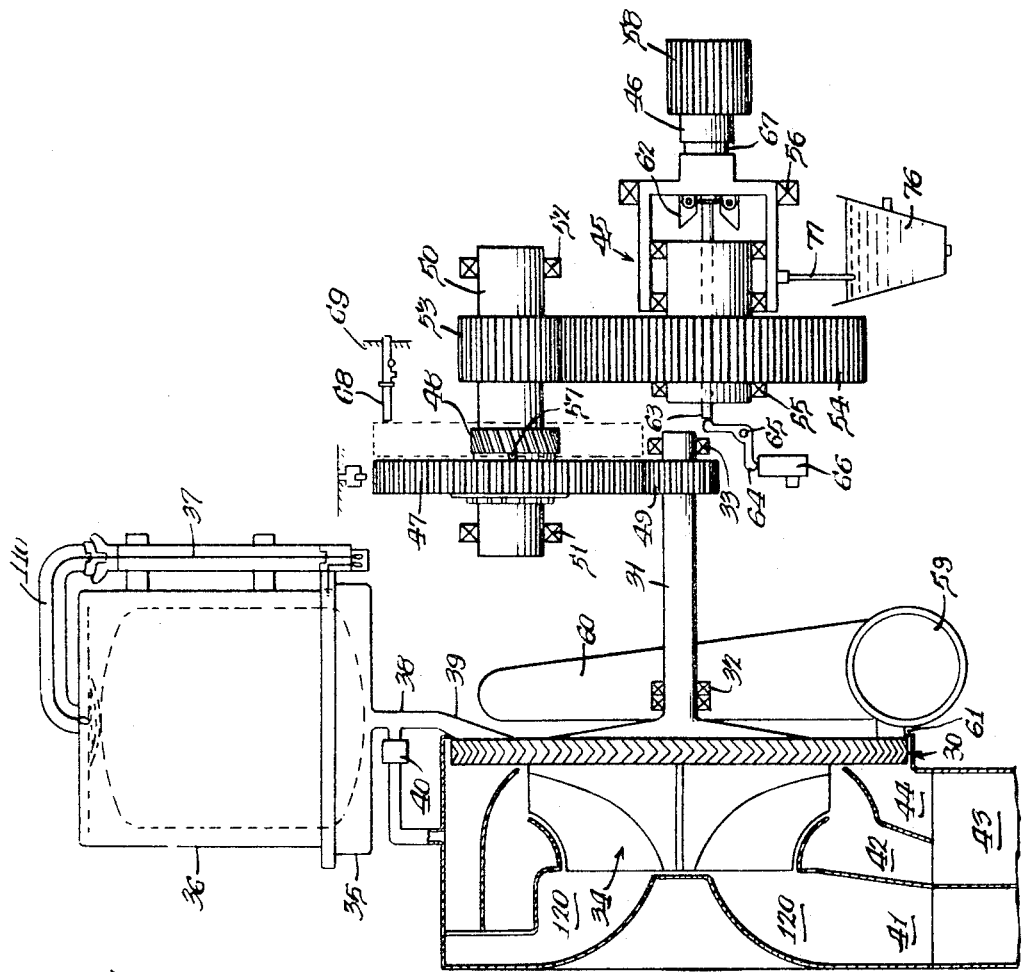

The relation of the operating elements of the present invention may be understood by reference to FIG. 1. A turbine wheel 30 with blades around its periphery is provide on a turbine shaft 31 to rotate therewith. Turbine shaft 31 is rotationally supported by bearings 32 and 33. A fan 34 is mounted on one end of the shaft 31 adjoining turbine wheel 30. A combustion chamber composed of a base 35 and a cover 36 is provided to contain a change of solid propellant. An electrical wiring system 37 provides a means for igniting the solid propellant. Gases produced by the combustion of the solid propellant pass down a manifold 38 and through a set of nozzles 39, which direct the flow of gases to rotate turbine wheel 30. A relief valve 40 normally limits the gas pressure in manifold 38 to 850±50 pounds per square inch. The gas pressure produced by the combustion in a solid propellant cartridge (in chamber 35, 36) at minus 65 degrees F. is approximately 700 pounds per square inch while the pressure produced in the cartridge at a temperature of 160 degrees F. is between 1100 and 1200 pounds per square inch. By utilizing a pressure relief valve which limits the gas pressure to approximately 850 pounds per square inch (which is only 150 pounds greater than the gas pressure at minus 65 degrees F.) the nozzles can be designed for this range and an almost constant torque is provided at all temperatures between 160 degrees F. and minus 65 degrees F. The common practice in similar turbine designs at the present time is to design the nozzles for temperatures of approximately 70 degrees F. with the result that the torque drops off rapidly as the temperature decreases and increases excessively as the temperature increases.

In order to lessen the danger of the hot gases, resulting from the combustion of the solid propellant, damaging other parts of the aircraft, surrounding equipment or personnel, the temperature of the exhaust gases is reduced by mixing them with air at ambient temperature. Referring to FIG. 6, the fan 34 draws air in through an inlet ducting 41 and expels it through a passage 42 into an outlet ducting 43. The hot exhaust gases are expelled through a passage 44 and are mixed with the exhaust air in the ducting 43 before being expelled overboard.

An important purpose of the fan is to produce sufficient aerodynamic drag, when rotated, that the turbine shaft and turbine wheel cannot exceed a predetermined speed, 65,000 revolutions per minute, for example, under any conditions when driven by gas or air.

Turbine shaft 31 has a gear 49 fixed thereon and meshing with a gear 47 on a helical spline 48. The latter is rigid on a shaft 50 rotatably in bearings 51 and 52 and having a gear 53 fixed thereon. Gear 53 meshes with a gear 54 driving a one-way clutch 45 including an output shaft 46 having a gear 58 thereon adapted for driving connection with a jet engine to be started. The assembly composed of gear 54 and clutch 45 is rotatable in bearings 55 and 56.

A safety means to prevent the turbine wheel 30 from reaching excessive speed is provided by one-way clutch 45. If the rotational velocity of the engine shaft connected with gear 58 exceeds the rotational velocity of the gear 54, the clutch prevents the starter from being driven by the engine.

If for any reason clutch 45 should fail to disengage when the engine speed exceeds that of the starter, a further safety means is provided by gear 47 mounted on helical spline gear 48. The helical spline of gear 48 is so orientated in supporting gear 47 that whenever gear 47 is driven by the turbine wheel 30 through shaft 31 and gear 49, the gear 47 tends to remain in mesh with the gear 49. However, whenever the engine speed exceeds that of the starter output shaft 46 to the extent that shaft 50 is driven at a greater rotational velocity (by the engine through gear 53, gear 54, a malfunction clutch 45 and shaft 46) then it is driven by the turbine wheel 30 through the gear 48, 47, 49 and shaft 31, the gear 47 will slide (to the right in FIG. 1) on gear 48, disengaging gear 49. In order to prevent gear 47 from disengaging gear 49 because of small engine surges, a shear pin 57 normally secures gear 47 to gear 48. Whenever the torque on shaft 50 produced by the engine exceeds the drag produced by the fan 34 by a predetermined value, pin 57 will shear allowing gear 47 to disengage from gear 49.

The combination of gear 49, gear 47, gear 48, shaft 50, gear 53 and gear 54 provides a reduction gear means which suitably reduces the output rotational velocity of the starter output shaft 46 and increases the torque provided by wheel 30 to start the engine.

The turbine wheel is driven by hot gases produced from combustion of a solid propellant and is also driven from a source of compressed air external to the aircraft. The compressed air is introduced to the blades of the turbine wheel 30 by a compressed air inlet 59, a compressed air manifold 60 and compressed air nozzles 61. The compressed air is exhausted through exhaust passage 44 and exhaust duct 43, in the same manner as the hot gases. A set of flyweights 62 flies outwardly when the speed of output shaft 46 reaches 2850 revolutions per minute. Their outward movement operates a shaft 63 axially, rotating an arm 64 about a pin 65 to operate a switch 66. The operation of switch 66 may be utilized to cause a valve (not shown) to cut off the supply of compressed air to the inlet 59 through a suitable electric circuit (not shown). When the rotational velocity of shaft 46 decreases to approximately 1500 revolutions per minute, the flyweights 62 will return to the position shown in FIG. 1, allowing microswitch 66 to return to its original condition.

The output shaft 46 has a "necked down" section 67 for the purpose of allowing it to shear if the torque produced at this point of the shaft reaches approximately 900 foot pounds. Thus the shear section provides a safety means to disengage the engine from the starter.

In order to indicate that shear pin 57 has sheared and that gear 47 is out of mesh with gear 49, a pin 68 is provided which will be forced to protrude from a starter housing 69 whenever such a condition exists.

Lubrication for the reduction gears and their supporting shafts is provided by an oil sump 76 and a set of oil slingers 77.

Referring to FIGS. 2–6, the starter housing 69, which directly or indirectly supports all elements of the starter, is constructed in two sections 69a and 69b and bolted together by a set of bolts 78. The housing 69 has joined to it a ducting housing 80 by means of a U-shaped (in cross section) clamp ring 81 secured by a bolt 82. FIG. 2, a front elevation of the starter, shows the spline gear 58 on the right-hand side. The shaft shear section 67 and the gear 58 extend beyond a mounting bracket 70. The mounting bracket 70 may be secured to the housing of an engine in such a manner that gear 58 will operably mesh with the engine shaft gearing. U-shaped clamping ring arcs 71 and 72 (FIG. 5), band 73 and bolt 74 are used to secure the starter housing 69 and mounting bracket 70 together.

A combination nozzle and manifold member 75 which contains the hot gas manifold 38 and the set of nozzles 39 may best be seen in FIG. 3 although portions of it are visible in FIGS. 2–5. In addition to clamping ducting housing 80 to starter housing 69, the clamp ring 81 also clamps the removable member 75 against the housing 69. The structure allowing for the simultaneous clamping of ducting housing 80 and the member 75 will be described in greater detail below. The purpose of such a structural arrangement is to provide for a quick disassembly of nozzle and manifold member 75 for replacement of its component parts for directing the hot gases toward the turbine blades and for cleaning the exhaust ducting enclosed in the housing 80.

Figure 4:
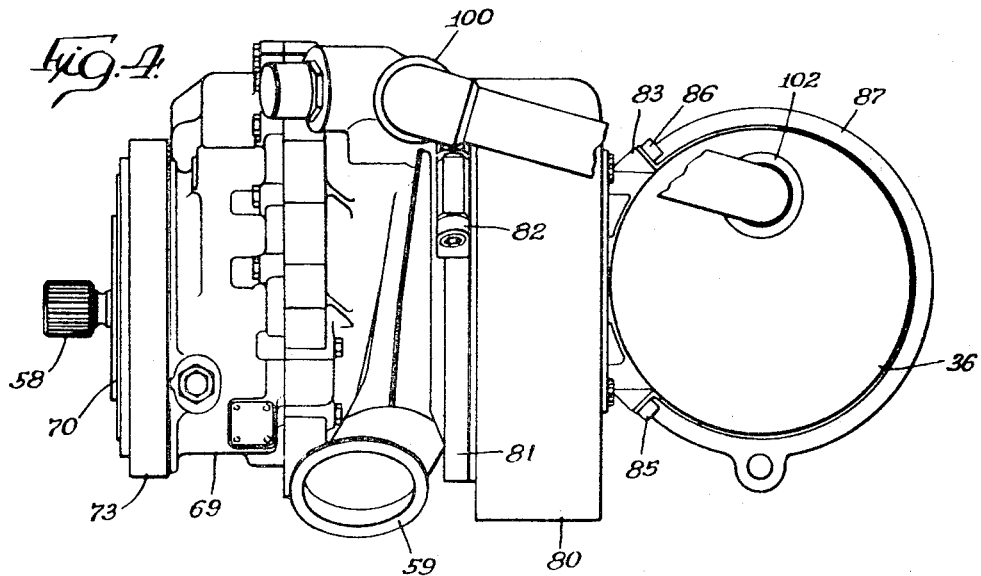
FIG. 4 is an external rear view of the starter with the combustion chamber mounted on the end of the ducting housing.
Figure 5:
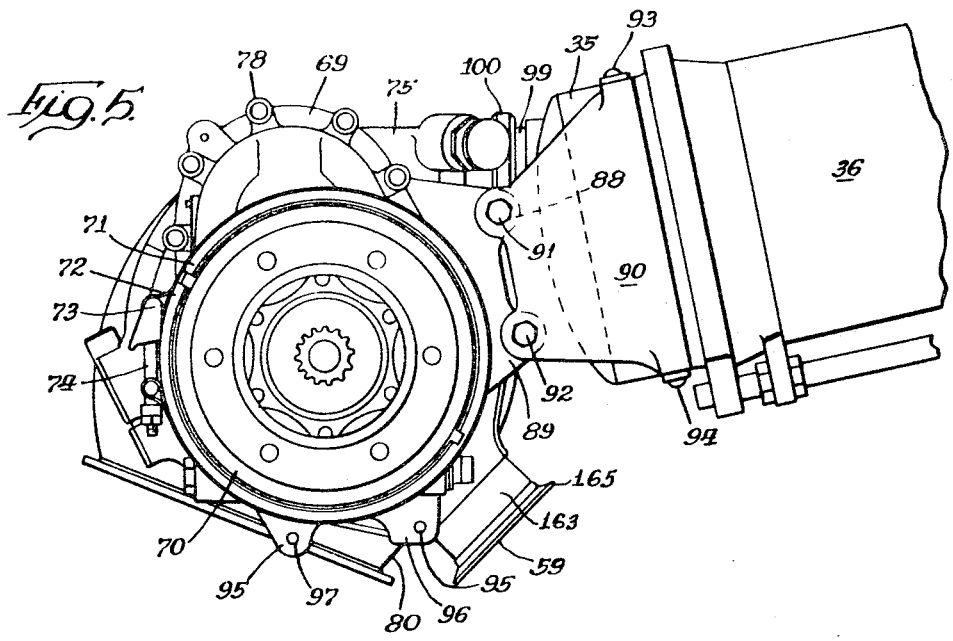
FIG. 5 is an external right end view of the starter with the combustion chamber mounted on the rear side of the starter housing.

The compressed air inlet passage 59 is shown in FIGS. 4, 5 and 8.

The member 75 is shown secured to housing 69 by a flange portion 121 inserted in a grooved portion of housing 69 and by a flange portion 122 secured against a flange portion 123 of the housing 80 by the U-shaped clamping ring 81. The manifold 38 constructed in nozzle and manifold member 75 has an inner metallic sleeve 124. The sleeve 124 is constructed of material which is highly resistant to the erosion brought about by the high temperature gases at pressures up to 850 pounds per square inch. For the purpose of quickly overhauling the manifold, the sleeve 124 may be slidably removed and replaced by another such sleeve.

Referring again to FIG. 6, the hot gases are directed by the nozzles against the blades of the turbine wheel 30 and are exhausted on the left-hand side of the wheel into exhaust passage 44. The exhaust gases pass through channel 44 into the outlet ducting 43 where they are well mixed with the exhaust air coming from fan 34 before being exhausted overboard.

Referring to FIGS. 5 and 6, the compressed air inlet 59 is formed by a ducting member 163. It is secured suitably to a compressed air manifold comprised of ducting members 161 and 162 welded together. A connector ring 165 is rigidly secured to the outboard end of ducting member 163 for the purpose of connecting with suitable compressed air ducting from an external source of compressed air (not shown). The compressed air manifold channel 160 formed by the ducting members 161 and 162 supplies compressed air to approximately three-fourths of the circumference of the turbine wheel. The remaining one-fourth of the circumference is utilized by the nozzle and manifold member 75 for supplying hot combustion gases to the wheel. Compressed air from manifold channel 160 is forced through nozzles formed in supporting member 166 by a series of nozzle vanes 167. The nozzles thus formed direct the compressed air against the bucket-shaped wheel blades to rotate the turbine wheel in the same manner that the turbine wheel can be driven by hot gases from the hot gas nozzles.

As shown in FIG. 7, nozzle support member 166 is secured to the main housing 69 by a set of bolts 169.

The clamp ring 81 not only permits the quick disassembly of the fan housing 80, the hot gas manifold 75 and the compressed air ducting 160, but also provides a substantial mass of metal around the turbine blades so that if a malfunction in the turbine control results in burst speeds, the disintegrating turbine blades will not rupture the housing and damage nearby equipment or injure personnel. Further, the clamp ring 81 permits the fan housing 80 to be selectively mounted on the starter housing 69 in any rotational position so that the inlet duct 41 and the outlet duct 44 may be positioned to suit the requirements of the installation.

While the structure herein described discloses a preferred embodiment of the present invention, modifications may be made which are within the true scope of the invention. Therefore, it is intended that the invention is limited only by the prior art and appended claims.

We claim:
1. In an engine starter for producing self-sustaining engine rotation; a drive mechanism including, a main shaft, a turbine mounted on said main shaft for rotation thereof, an output shaft driven by said main shaft and adapted to be connected to an engine to be started; a first housing member surrounding a portion of said drive mechanism, additional means connected to said first housing having a generally arcuate mounting surface, a manifold separate from said housing for supplying gases to said turbine releasably engaging a portion of said first housing member, said manifold having a generally arcuate mounting surface, a second housing member surrounding a portion of said drive mechanism and having means engaging both said additional means mounting surface and said manifold mounting surface, and means for releasably clamping said mounting surfaces to said engaging means whereby the housing may be assembled or disassembled along with the manifold by unclamping the second housing member.

2. In an engine starter for producing self-sustaining engine rotation; a drive mechanism including a main shaft, a turbine mounted on said main shaft for rotation thereof, an output shaft driven by said main shaft and adapted to be connected to an engine to be driven; a first housing member surrounding a portion of said drive mechanism, a manifold for supplying hot combustion gases to said turbine releasably mounted on said first housing and having a mounting surface thereon, a compressed air manifold releasably mounted on said first housing member and having a mounting surface thereon, a second housing member surrounding a portion of said drive mechanism and having means engaging said mounting surfaces, and means for releasably clamping said mounting surfaces to said engaging means whereby the housing members and manifolds may be disassembled by removing said second housing member.

3. In an engine starter for producing self-sustaining engine rotation; a drive mechanism including a main shaft, a turbine mounted on said main shaft, an output shaft driven by said main shaft and adapted to be connected to an engine to be driven; a first housing member surrounding a portion of said drive mechanism, an arcuate hot gas manifold for supplying hot combustion gases to said turbine and having a tongue releasably engaging a groove in said first housing, said hot gas manifold having an arcuate mounting surface in a radial plane, an arcuate compressed air manifold for supplying compressed air to said turbine releasably mounted on said first housing member, said air manifold having an arcuate mounting surface in said radial plane, a second housing member surrounding a portion of said drive mechanism and having an annular mounting surface adjacent said gas and air manifold surfaces, and means for releasably clamping said second housing mounting surface to said manifold mounting surfaces, said clamping means permitting said second housing member to be fixed in any desired rotational position relative to said first housing member.

4. In an engine starter for producing self-sustaining engine rotation as defined in claim 3, wherein said clamping means includes a split clamp ring surrounding said mounting surfaces.

5. In an engine starter for producing self-sustaining engine rotation; a drive mechanism including a main shaft, a turbine mounted on said main shaft for rotation thereof, an output shaft driven by said main shaft and adapted to be connected to an engine to be driven; a first housing member surrounding a portion of said drive mechanism, said first housing member having a radially opening groove in the upper portion thereof, a bearing in said first housing member receiving said main shaft, an arcuate hot gas manifold for delivering hot combustion gases to said turbine having a tongue thereon engaged with said groove, an arcuate mounting surface on said manifold in a radial plane, a frusto-semi-conical clamping surface on said manifold, an arcuate compressed air manifold support mounted releasably on the lower portion of said housing, said support having a mounting surface in said radial plane, a frusto-semi-conical clamping surface on said support in the same plane as said gas manifold clamping surface, a second housing member surrounding a portion of said drive mechanism and having a mounting surface engaging both of said gas and air manifold mounting surfaces, said second housing having a frusto-conical clamping surface, and a split clamp ring having oppositely tapered frusto-conical surfaces engaging said manifold clamping surfaces and said second housing clamping surface for securing the first and second housing members together with the hot gas and compressed air manifolds and permitting said second housing member to be clamped in any desired rotational position relative to said first housng member.

6. In an engine starter for producing self-sustaining enging rotation; a drive mechanism including a main shaft, a turbine mounted on said main shaft having turbine blades extending in a radial plane, an output shaft driven by said main shaft and adapted to be connected to an engine to be rotated; a first housing member surrounding a portion of said drive mechanism having a radially opening groove in the upper portion thereof, an arcuate hot gas manifold for delivering hot combustion gases to said turbine having a tongue engaged in said groove, said manifold having nozzles opening on one radial side of said turbine blades and an axially extending annular flange partially surrounding said turbine blades, the end of said flange lying in said plane and defining a mounting surface, said manifold having a frusto-semi-conical clamping surface thereon, an arcuate compressed air support member for directing air against said one side of the turbine blades and having means connected to said first housing member, an axially extending annular flange on said support member partially surrounding said turbine blades, the end of said support flange lying in said plane and defining a mounting surface, said support member having a frusto-semi-conical clamping surface thereon in the same plane as said manifold clamping surface, a second housing member surrounding a portion of said drive mechanism and having exhaust ducting therein for receiving gases from said turbine, said second housing member having an annular recess therein for receiving said flanges, the end of the recess lying in said plane and engaging said mounting surfaces, a frusto-conical clamping surface on said second housing member, and a split ring clamp having oppositely tapered frusto-conical surfaces engaging said clamping surfaces for clamping said members together, said clamp surrounding said turbine blades to thereby contain the blades in the event of burst speeding.

7. In an engine starter for producing self-sustaining engine rotation; a drive mechanism including a main shaft, a turbine mounted on said main shaft for rotation thereof, an output shaft driven by said main shaft and adapted to be connected to an engine to be driven; a first housing member surrounding a portion of said drive mechanism, a manifold for supplying hot combustion gases to said turbine releasably mounted on said first housing and having a mounting surface thereon, additional means mounted on said first housing member and having a mounting surface thereon, a second housing member surrounding a portion of said drive mechanism and having means engaging said mounting surfaces, and means for releasably clamping said mounting surfaces to said engaging means whereby the housing members and manifold may be disassembled by removing said second housing member.

8. An engine starter as defined in claim 7, wherein said turbine has peripherally extending blades thereon, said manifold mounting surface, said additional means mounting surface and said second housing member engaging means being substantially in a radial plane extending through said turbine blades, said clamping means including a clamp ring in said radial plane engaging said manifold, said second housing member and said additional means, said second housing member, said manifold, said additional means, and said clamp together having sufficient structural strength in said radial plane to hold the turbine blades in the housing upon disintegration.

References Cited by the Examiner
UNITED STATES PATENTS

| | | | |
|---|---|---|---|
| 1,156,549 | 10/1915 | Perry. | |
| 2,141,401 | 12/1938 | Martinka | 253—39.1 |
| 2,296,702 | 9/1942 | Butler et al. | 253—39.1 |
| 2,383,948 | 9/1945 | Alford | 253—65 |
| 2,459,519 | 1/1949 | Graham et al. | 253—59 |
| 2,494,328 | 1/1950 | Bloomberg | 253—65 |
| 2,641,442 | 6/1953 | Buchi | 253—65 |
| 2,806,351 | 9/1957 | Kent et al. | 60—39.14 |
| 2,839,894 | 6/1958 | Shutts et al. | 60—39.31 |
| 2,880,578 | 4/1959 | Nardone | 60—39.14 |

JULIUS E. WEST, *Primary Examiner.*